United States Patent
Ilg (12)

(10) Patent No.: US 6,333,570 B1
(45) Date of Patent: Dec. 25, 2001

(54) POWER SUPPLY SYSTEM WITH TWO BATTERIES OF DIFFERENT VOLTAGE

(75) Inventor: Johannes Ilg, Regensburg (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/532,456

(22) Filed: Mar. 23, 2000

(30) Foreign Application Priority Data

Mar. 23, 1999 (DE) .............................. 199 13 131

(51) Int. Cl.$^7$ ...................................... H02J 1/00
(52) U.S. Cl. .............................................. 307/75
(58) Field of Search .................. 307/69, 71, 72, 307/75, 85, 86

(56) References Cited

U.S. PATENT DOCUMENTS 4,156,171 * 5/1979 Kofink ................................ 320/17
5,233,229 * 8/1993 Kohl .................................. 307/10.1
5,784,626 * 7/1998 Odaohara ....................... 395/750.01

FOREIGN PATENT DOCUMENTS 196 02 171 A1 7/1997 (DE) .
196 45 944 A1 5/1998 (DE) .

* cited by examiner

*Primary Examiner*—Matthew Nguyen

(57) ABSTRACT

A power supply system contains two batteries and a load device which is connected to the batteries such that, upon failure of one of the batteries, the other takes over the supply of power. The batteries and the load device are connected to one another by a single ground line and arranged such that, upon an interruption between the interconnected grounds of the batteries and the ground of the load device, the load device is fed with the difference voltage of the batteries. A reliably operating power supply system is created which is operational by with only one ground line.

17 Claims, 4 Drawing Sheets

POWER SUPPLY SYSTEM WITH TWO BATTERIES OF DIFFERENT VOLTAGE

CROSS REFERENCE TO RELATED APPLICATIONS

This application claims the benefit of priority based on German Application No. 19913131.7, filed on Mar. 23, 1999, which is incorporated by reference herein in its entirety.

BACKGROUND OF THE INVENTION

The invention relates to a power supply system with two batteries of different voltages and at least one load device which is connected in parallel with both batteries, such that if one battery fails, the other battery assures the supply of power. Such duplicate power supplies are gaining interest in areas such as automobiles, where it is necessary to assure operation of apparatus critical to safety.

FIG. 4 shows a block circuit diagram of a conventional power supply system. Voltage terminals 2 and 4 of an electronic control apparatus 6 are connected each through fuses 8 and 10, respectively, to batteries 12 and 14, respectively. Battery 12 in the example shown has a voltage of 12 V and battery 14 has a voltage of 42 V. Each voltage terminal leads to power supply centers 16 and 18, respectively, which are matched to a particular battery voltage. Each power supply center is connected to an electronic control unit 20 whose output signal operates, through an output 22, a switch 24 which is contained in a unit 26 to be controlled by the control apparatus 6.

The power is supplied to the unit 26 via power supply lines 28 and 30, each connected to one of the two batteries 12 and 14, respectively, and connected by diodes 32 and 34, respectively, to the input terminal of switch 24.

A ground conductor 36 runs from the battery 14 to the ground connection of the control apparatus 6 and to the ground connection of the unit 26. The ground of battery 12 is connected by an additional ground line, which can be the vehicle body itself, to the ground of the control apparatus 6.

The operation of this conventional power supply system is well known in the art. If either of the two batteries 12 or 14 fails, the remaining battery supplies the power. The diodes 32 and 34 and/or the power supply centers provide assurance that current flows only from the operational battery to the unit 26 and prevents the occurrence of a short circuit discharge.

In order to reduce cost and weight, and to improve safety, it is desirable to eliminate the additional ground connection 36, which is typically designed with a large cross section.

Additionally, the diagnosis of the two separate grounds can be difficult and is prone to errors.

A short circuit in the lines of connected units or sensors (not shown) should have as little effect as possible on the operation of the overall system.

Another conventional power supply system is disclosed in DE 196 02 171 A1. According to this power supply system, the power input of a voltage regulator is connected through a double diode to both a main line connected to the positive pole of a battery and to a secondary line which is connected through an ignition switch to the positive pole of the on-board network. A buffer condenser is connected to the secondary line and all grounds of the system are brought together. In the event of a voltage collapse on the main line, the power is supplied through the secondary line with current flowing from the buffer condenser. If the voltage on the secondary line collapses, power is supplied through the buffer condenser, which is of sufficient size to buffer the power input.

Yet another conventional power supply system is disclosed in DE 196 45 944 A1. This power supply system contains a controller for an on-board network with at least two batteries which serve to power various load devices. The controller is between the two batteries and contains a power supply center which is connected through diodes to the two batteries. The system has a common ground. The controller also has a bidirectional connection for a bus, such as a CAN bus.

In the event of interruptions of the ground connection between the batteries, failures, which are difficult to diagnose, can occur in the load device of the conventional power supply systems described above.

SUMMARY OF THE INVENTION

The present invention provides for a power supply system with improved operating reliability.

The present invention also provides a power supply that assures power is supplied in the event of a battery failure, and when the ground connections between the batteries on the one hand and the load on the other hand fail, the load is supplied with the voltage difference between the batteries.

With the power supply system according to the present invention, a supply of power is assured in the event of virtually all individual failures. If a failure occurs in the ground of the load device, the potential applied to this device is increased by the smaller battery voltage. The battery of weaker voltage is then charged by the supply current.

In the case of a motor vehicle, the ground terminals of both batteries can be common with the car body. Individual failures in power lines do not lead to a loss of function. With a simple voltage measurement or threshold circuit, the lines can be diagnosed with a trouble signal at which time the car can be taken to a service shop.

The invention is applicable wherever load devices are supplied with current by two batteries of different voltage, so that power will be supplied even if one battery fails or there is another problem. The invention is especially advantageous when used in motor vehicles where numerous safety-critical load devices are to be supplied with power with maximum reliability (e.g., electronic motor controls, airbags, etc.).

The present invention is achieved by providing a power supply system. The system comprises a first battery connected to a first line at a first voltage relative to ground; a second battery connected to a second line at a second voltage relative to ground; a load device having a third line adapted to be connected to one of the first and second lines and having a fourth line adapted to be connected to ground; and a set of diodes associated with the load device. The set of diodes includes a first diode permitting current flow from the first line to the third line when the first voltage is greater than the second voltage; a second diode permitting current flow from the second line to the third line when the second voltage is greater than the first voltage; a third diode permitting current flow from the fourth line to the second line when i) the first voltage is greater than the second voltage and ii) the fourth line is disconnected from ground; and a fourth diode permitting current flow from the fourth line to the first line when i) the second voltage is greater than the first voltage and ii) the fourth line is disconnected from ground.

The present invention is also achieved by providing a power supply system for connecting a first battery and a second battery to a load device. Each of the batteries has a positive terminal and a negative terminal, and the load device has an inlet and an outlet. The system comprises a first diode having a first anode adapted to be connected to the positive terminal of the first battery and a first cathode adapted to be connected to the input of the load device; a second diode having a second anode adapted to be connected to the positive terminal of the second battery and a second cathode adapted to be connected to the input of the load device; a third diode having a third anode adapted to be connected to the output of the load device and a third cathode adapted to be connected to the positive terminal of the first battery; and a fourth diode having a fourth anode adapted to be connected to the output of the load device and a fourth cathode adapted to be connected to the positive terminal of the second battery.

The present invention is further achieved by providing a method of supplying power from first and second batteries to a load device. The first battery has a first voltage relative to ground, the second battery has a second voltage relative to ground, and the load device has an inlet and outlet. The method comprises supplying a first current to the load device inlet from the first battery when the first voltage is greater than the second voltage; supplying a second current to the load device inlet from the second battery when the second voltage is greater than the first voltage; connecting the second battery in series between the output of the load device and the first battery when i) the first voltage is greater than the second voltage and ii) a common ground between the load device and the two batteries is broken; and connecting the second battery in series between the first battery and the input of the load device when i) the second voltage is greater than the first voltage and ii) the common ground is broken.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

Figure 1:
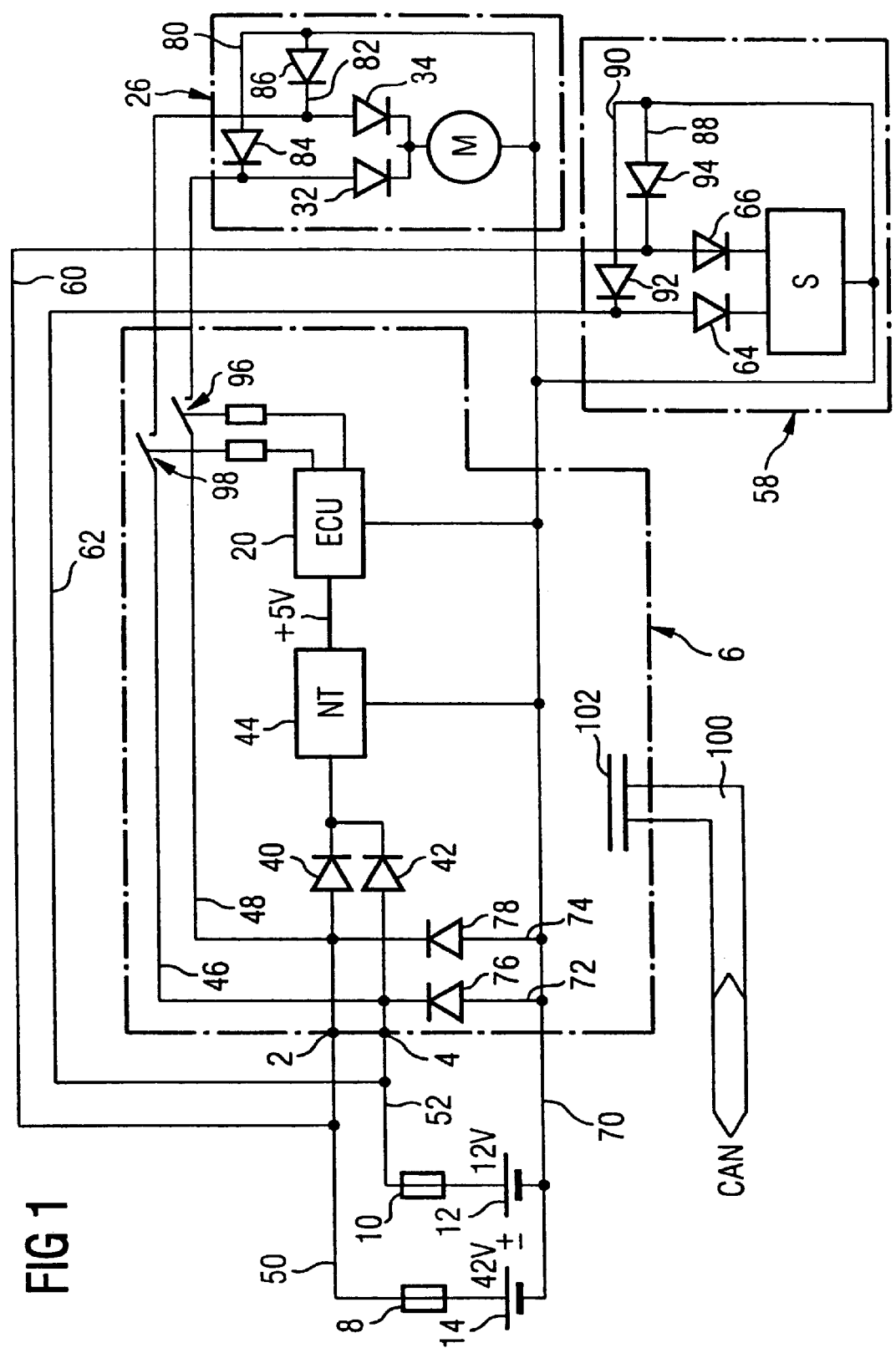
FIG. 1 is a schematic diagram of a power supply system according to the present invention.

FIG. 1 is a schematic diagram of a power supply system according to the present invention. Voltage terminals 2 and 4 of a control apparatus 6 are connected through fuses 8 and 10, respectively, to the positive terminal of each of the two batteries 12 and 14, respectively. The battery 12 in the example shown supplies a voltage of 12 V and battery 14 supplies a voltage of 42 V. In the control apparatus 6, diodes 40 and 42 are connected to terminals 2 and 4, respectively, so that the batteries 12 and 14 are connected in parallel at the input of a power supply center 44. The diodes 40 and 42 ensure that battery 14 cannot discharge through battery 12, and in the event of a fault in battery 14 (e.g., a voltage collapse due to complete discharge), battery 14 cannot discharge through battery 12.

The power supply center can be a conventional switched mode power supply center that enables operation with supply voltages between, for example, 6 and 50 V. The power supply center 44 is followed by a control unit 20 which is energized by the power supply center with a supply voltage of 5 V.

A unit 26, e.g., a servo motor, can be connected by lines 46 and 48 to supply lines 50 and 52, respectively, coming from batteries 12 and 14, respectively. Each of the supply lines 46 and 48 contains diodes 32 and 34, respectively.

An additional load device, e.g., a sensor 58, can also be connected to the supply lines 50 and 52 through lines 60 and 62, respectively, in each of which is a diode 64 and 66, respectively.

The ground connection of the entire system is made through a single ground line 70 that connects all grounds.

Connecting lines 72 and 74 are connected to the ground line 70 and to the supply lines 50 and 52, respectively, on the sides of the diodes 40 and 42, respectively, that are remote from the power supply center 44.

In each of the lines 72 and 74 there is a diode 76 and 78, respectively, which permits current to flow only from the ground line to the supply line.

Similarly, the ground of unit 26 is connected by connecting lines 80 and 82 with diodes 84 and 86, respectively, to lines 46 and 48, respectively. Also, the ground of the sensor 58 is connected by connecting lines 88 and 90 with the diodes 92 and 94 that connect them to lines 60 and 62, respectively.

Switch means 96 and 98 (e.g., relays or power FET's), are connected to the output of the control unit 20 and can interrupt the lines 46 and 48 according to an output signal from the control unit 20.

The operation of the system will now be described in detail.

As long as both batteries 12 and 14 are operative, power is supplied by the stronger battery 14 with a higher voltage. If battery 14 fails, battery 12 takes over supplying power. It should be noted that the unit 26 and the sensor 58 are sufficiently insensitive to voltage for their ability to operate. If desired, these load devices can have their own power supply center.

Also, as shown in FIG. 1, a signal line 100 (e.g., a CAN bus) can be used to connect the control apparatus 6 to another control apparatus. This signal line 100 is capacitance-coupled at 102 to an output, not shown, of the control apparatus 6.

With the aid of FIG. 2 the operation of the system of FIG. 1 will be explained hereinbelow in the case of an interruption 104 of the ground line 70 between the batteries 12 and 14 and the control apparatus 6, and between the control apparatus 6 and the sensor 58 at 106.

Figure 2:
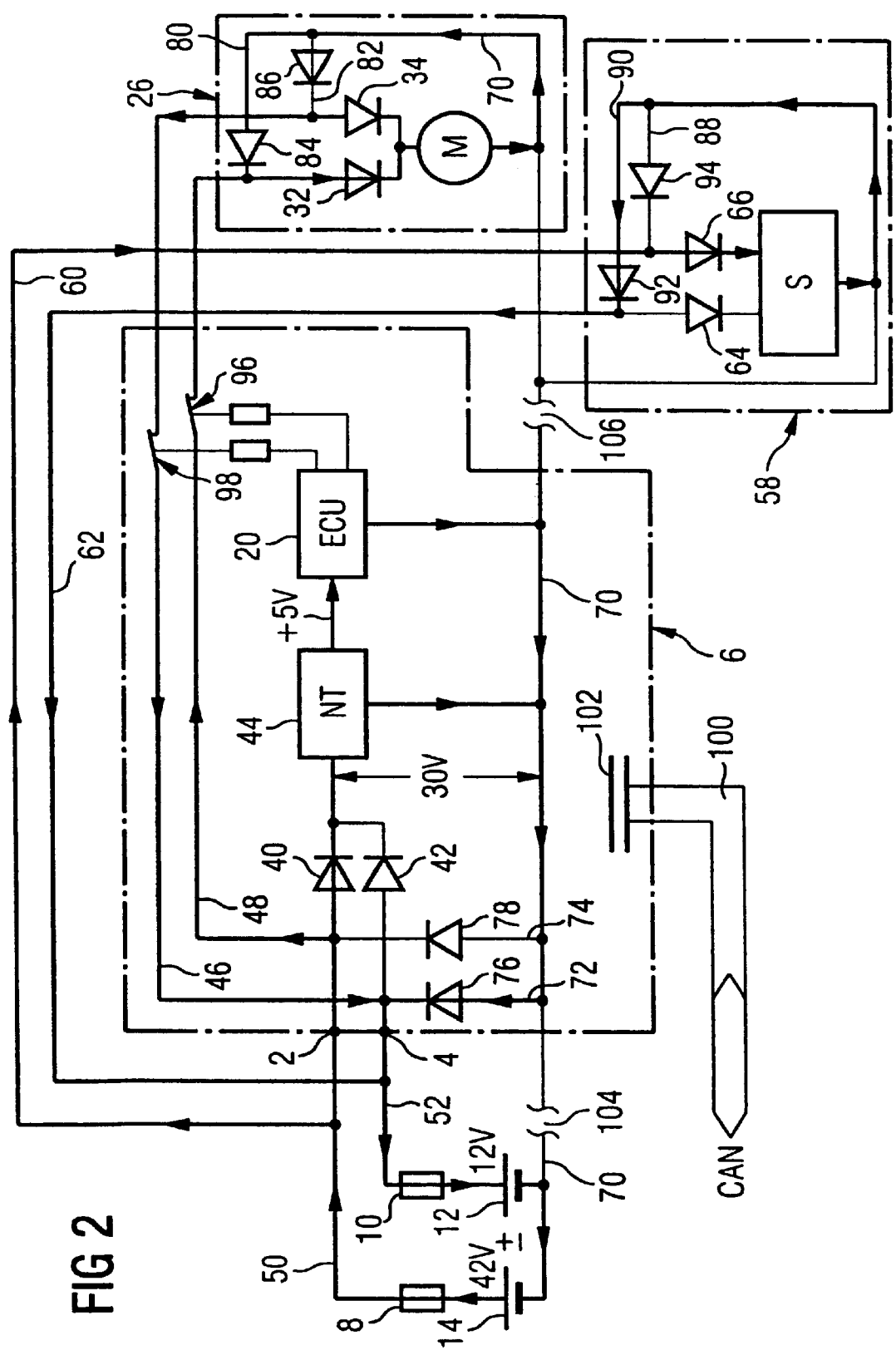
FIG. 2 is a current flow diagram of the circuit shown in FIG. 1, in the case of existing ground faults.

As shown in FIG. 2, the switch means 96 and 98 are shown in the closed position, unlike FIG. 1.

In the event of ground interruptions, the return current to the batteries can no longer pass through the ground line, but is passed through other current paths. These other current paths are drawn in heavy lines in FIG. 2.

The current flows from the battery 14 through the supply line 50 and the diode 40 to the power supply center 44. And from the ground of power supply center 44, current flows through the connecting line 72 and the diode 76 through battery 12 to battery 14. In this manner the voltage difference between the two batteries 12 and 14 is present at the power supply center 44, namely 30 V in the example represented, battery 12 being charged by the current output of battery 14.

Similarly, the current flows from the supply line 50 through line 48 to unit 26 and from its ground through the connecting line 82 with the diode 86 and line 46, back to supply line 52.

In like manner, the supply of power to the sensor 58 runs through line 60 and diode 66 and then through the connecting line 90 and the diode 92 to line 62.

The raising of the potential of the individual devices by the voltage of battery 12 is without effect as long as the individual load devices are not connected electrically with additional load devices which are possibly at a different potential. If this is the case, as for example in the connection through the signal line 100, the particular line is coupled differentially or capacitively, so that a secure signal transfer is possible regardless of the potential. The signal line 100 contains, for example, two counterpolarizing lines as a CAN bus.

Figure 3:
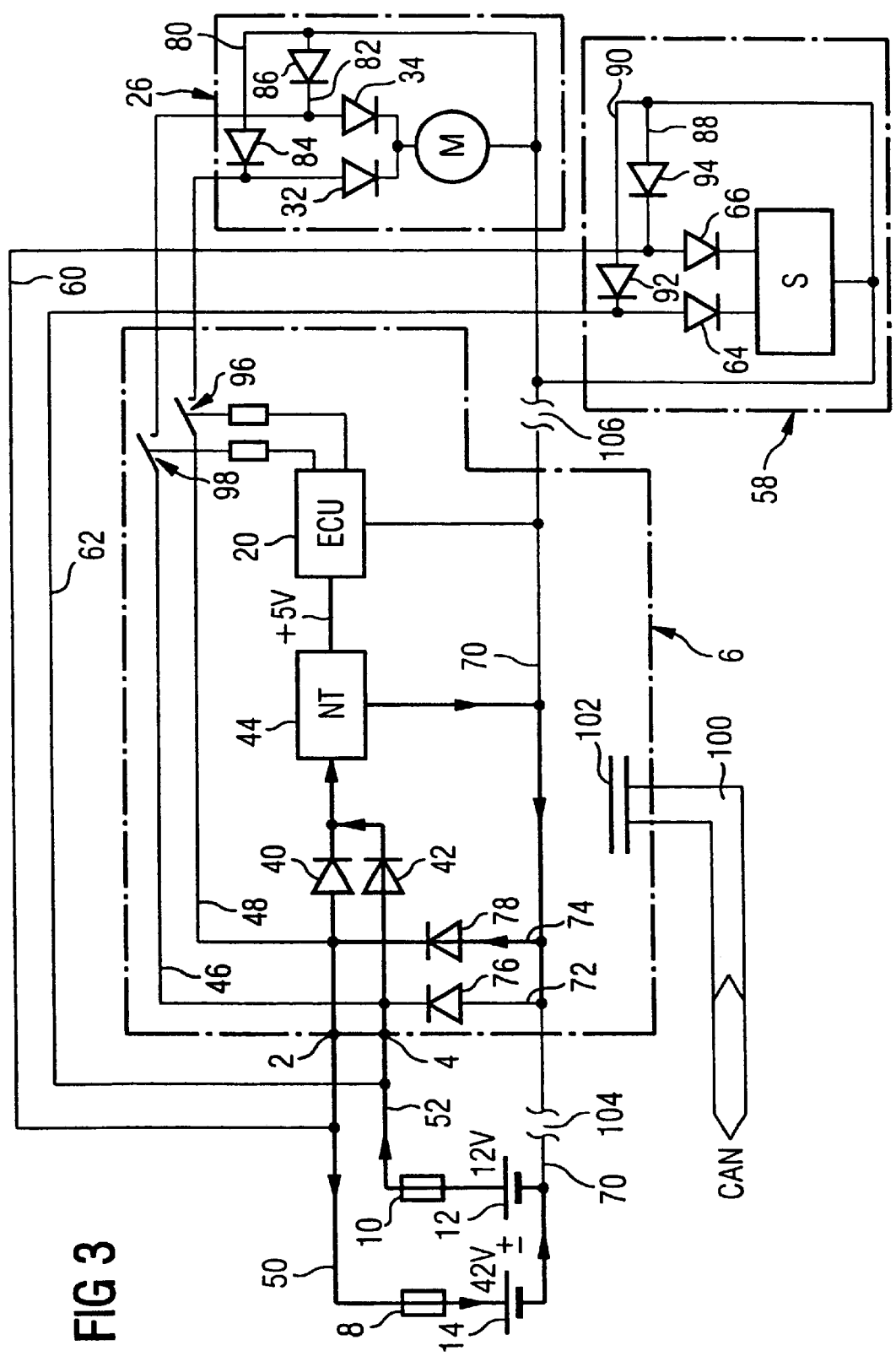
FIG. 3 is a current flow diagram of the present invention in the case a voltage loss in one battery and the ground faults of FIG. 2.
Figure 4:
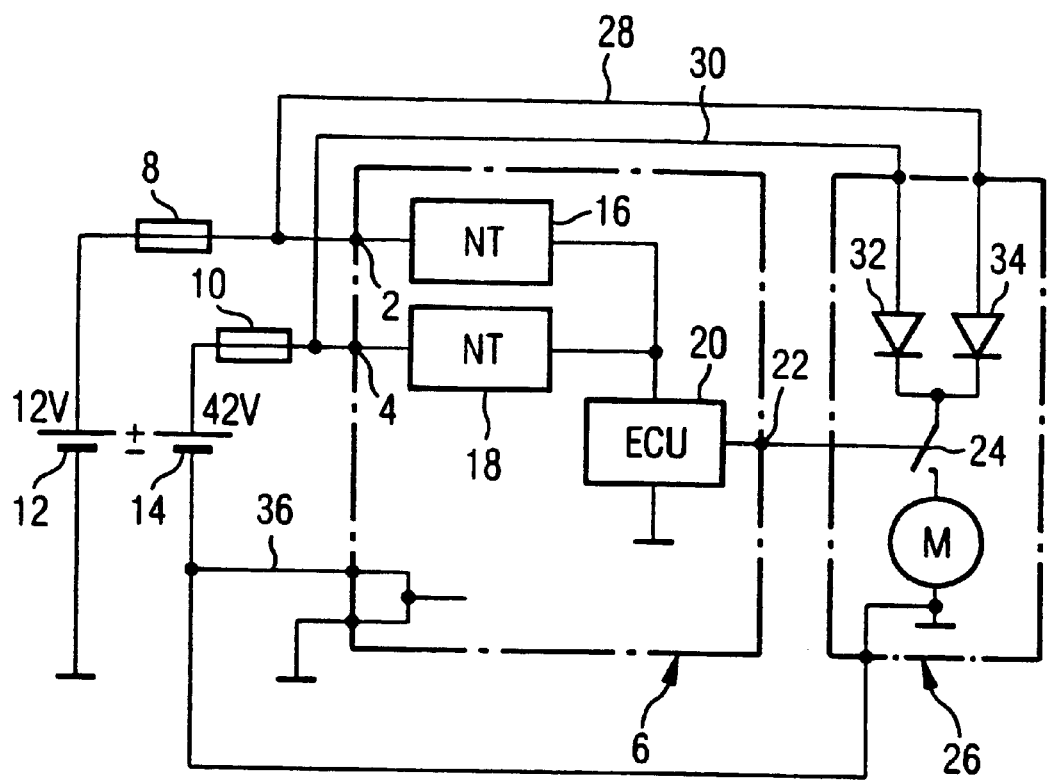
FIG. 4 is a conventional power supply system.

If in the state of the circuit according to FIG. 2 the battery 14 drops out because it is exhausted, the result is a circuit as shown in FIG. 3 for feeding the power supply center. The current flows from the battery 12, through the supply line 52 and the diode 42 to the power supply center 44, and from the ground 70 for the power supply center 44 through the connecting line 74 and the diode 78 to the supply line 50, where it flows as current for charging battery 14, and to the ground terminal of battery 12. Of course, this way of supplying power stops as soon as battery 14 is charged to the voltage of battery 12.

The system described can be varied in many ways. The ground line 70 can be, for example, the motor vehicle's body to which the various apparatus and load devices are connected.

Several units can be connected to the control apparatus 6, all of them connected to the batteries by lines switched in the control apparatus 6 like the lines 46 and 48, etc.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A power supply system, the system comprising:
   a first battery connected to a first line at a first voltage relative to ground;
   a second battery connected to a second line at a second voltage relative to ground;
   a load device having a third line adapted to be connected to one of the first and second lines and having a fourth line adapted to be connected to ground; and
   a set of diodes associated with the load device, the set of diodes including:
     a first diode permitting current flow from the first line to the third line when the first voltage is greater than the second voltage;
     a second diode permitting current flow from the second line to the third line when the second voltage is greater than the first voltage;
     a third diode permitting current flow from the fourth line to the second line when i) the first voltage is greater than the second voltage and ii) the fourth line is disconnected from ground; and
     a fourth diode permitting current flow from the fourth line to the first line when i) the second voltage is greater than the first voltage and ii) the fourth line is disconnected from ground.

2. The system according to claim 1, wherein the third diode is connected to the second line between the second battery and the second diode, and the fourth diode is connected to the first line between the first battery and the first diode.

3. The system according to claim 1, wherein the load device comprises a housing having a first terminal connected to the first line, a second terminal connected to the second line, and a third terminal connected to ground.

4. The system according to claim 3, wherein the first and second diodes are located within the housing.

5. The system according to claim 3, wherein the third and fourth diodes are located within the housing.

6. The power supply system according to claim 1, further comprising:
   a capacitance coupling adapted for linking the load device to a control apparatus operating at a different voltage relative to the load device.

7. The system according to claim 1, wherein the load device includes a power supply center, the power supply center receiving a variable input voltage and supplying a substantially constant output voltage.

8. The system according to claim 1, further comprising:
   at least one additional load device connected to the first and second lines, each at least one additional load device being connected in parallel with respect to the load device; and
   a corresponding at least one additional set of diodes associated respectively with the at least one additional load device.

9. The system according to claim 1, further comprising:
   a first additional load device including an actuator connected by a fifth line to the first line and connected by a sixth line to the second line;
   a first additional set of diodes associated with the first additional load device, the first additional set of diodes including:
     a fifth diode in the fifth line permitting current flow from the first line to the actuator when the first voltage is greater than the second voltage;
     a sixth diode in the sixth line permitting current flow from the second line to the actuator when the second voltage is greater than the first voltage;
     a seventh diode permitting current flow from the actuator to the sixth line when i) the first voltage is greater than the second voltage and ii) the actuator is disconnected from ground; and
     an eighth diode permitting current flow from the actuator to the fifth line when i) the second voltage is greater than the first voltage and ii) the actuator is disconnected from ground;
   a second additional load device including a sensor connected by a seventh line to the first line and connected by an eighth line to the second line;
   a second additional set of diodes associated with the second additional load device, the second additional set of diodes including:
     a ninth diode in the seventh line permitting current flow from the first line to the sensor when the first voltage is greater than the second voltage;

a tenth diode in the eighth line permitting current flow from the second line to the sensor when the second voltage is greater than the first voltage;

an eleventh diode permitting current flow from the sensor to the eighth line when i) the first voltage is greater than the second voltage and ii) the sensor is disconnected from ground; and a twelfth diode permitting current flow from the sensor to the seventh line when i) the second voltage is greater than the first voltage and ii) the sensor is disconnected from ground;

a first switch in the fifth line, the first switch being controlled by the load device;

a second switch in the sixth line, the second switch being controlled by the load device; and a capacitance coupling adapted for linking the load device to a control apparatus operating at a different voltage relative to the load device.

10. A power supply system for connecting a first battery and a second battery to a load device, each of the batteries having a positive terminal and a negative terminal, and the load device having an inlet and an outlet, the system comprising:

a first diode having a first anode adapted to be connected to the positive terminal of the first battery and a first cathode adapted to be connected to the input of the load device;

a second diode having a second anode adapted to be connected to the positive terminal of the second battery and a second cathode adapted to be connected to the input of the load device;

a third diode having a third anode adapted to be connected to the output of the load device and a third cathode adapted to be connected to the positive terminal of the first battery; and a fourth diode having a fourth anode adapted to be connected to the output of the load device and a fourth cathode adapted to be connected to the positive terminal of the second battery.

11. A method of supplying power from first and second batteries to a load device, the first battery having a first voltage relative to ground, the second battery having a second voltage relative to ground, and the load device having an inlet and outlet, the method comprising:

supplying a first current to the load device inlet from the first battery when the first voltage is greater than the second voltage;

supplying a second current to the load device inlet from the second battery when the second voltage is greater than the first voltage;

connecting the second battery in series between the output of the load device and the first battery when i) the first voltage is greater than the second voltage and ii) a common ground between the load device and the two batteries is broken; and connecting the second battery in series between the first battery and the input of the load device when i) the second voltage is greater than the first voltage and ii) the common ground is broken.

12. The method according to claim 11, further comprising:

providing a first positive terminal on the first battery; and
providing a second positive terminal on the second battery.

13. The method according to claim 12, wherein the supplying the first current includes connecting the first positive terminal to the inlet, the supplying the second current includes connecting the second positive terminal to the inlet, the connecting the second battery between the output and the first battery includes connecting the first positive terminal to the inlet and connecting the outlet to the second positive terminal, and the connecting the second battery between the first battery and the input includes connecting the second positive terminal to the inlet and connecting the outlet to the first positive terminal.

14. The method according to claim 12, further comprising:

providing a set of diodes associated with the load device, the set of diodes including:

a first diode having a first anode adapted to be connected to the first positive terminal and a first cathode adapted to be connected to the input of the load device;

a second diode having a second anode adapted to be connected to the second positive terminal and a second cathode adapted to be connected to the input of the load device;

a third diode having a third anode adapted to be connected to the output of the load device and a third cathode adapted to be connected to the first positive terminal; and a fourth diode having a fourth anode adapted to be connected to the output of the load device and a fourth cathode adapted to be connected to the second positive terminal.

15. The method according to claim 14, further comprising:

providing at least one additional load device connected to the first and second positive terminals, each at least one additional load device being connected in parallel with respect to the load device; and providing a corresponding at least one additional set of diodes associated respectively with the at least one additional load device.

16. The method according to claim 14, further comprising:

providing a housing for the load device, the housing having a first terminal connected to the first positive terminal, a second terminal connected to the second positive terminal, and a third terminal connected to the common ground.

17. The system according to claim 16, wherein the first, second, third, and fourth diodes are located within the housing.

* * * * *